United States Patent
Kamino et al.

(10) Patent No.: US 8,413,929 B2
(45) Date of Patent: Apr. 9, 2013

(54) AIRCRAFT ASSEMBLY

(75) Inventors: Yuichiro Kamino, Nagoya (JP); Kazuyuki Oguri, Nagoya (JP); Koichi Nakamura, Nagoya (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 12/739,060

(22) PCT Filed: Mar. 23, 2009

(86) PCT No.: PCT/JP2009/055712
§ 371 (c)(1),
(2), (4) Date: Apr. 21, 2010

(87) PCT Pub. No.: WO2009/119526
PCT Pub. Date: Oct. 1, 2009

(65) Prior Publication Data
US 2010/0224724 A1    Sep. 9, 2010

(30) Foreign Application Priority Data

Mar. 24, 2008    (JP) .................................. 2008-076547

(51) Int. Cl.
*B64C 1/12* (2006.01)
*B64D 45/02* (2006.01)

(52) U.S. Cl.
USPC ............................. 244/132; 244/1 A; 361/218

(58) Field of Classification Search .................. 244/1 A, 244/119, 123.5, 123.1, 133; 361/218
See application file for complete search history.

(56) References Cited

U.S. PATENT DOCUMENTS

| 4,186,237 | A | * | 1/1980 | Propp | 428/323 |
| 4,429,341 | A | * | 1/1984 | King | 361/117 |
| 4,502,092 | A | * | 2/1985 | Bannink et al. | 361/218 |
| 4,556,591 | A | * | 12/1985 | Bannink, Jr. | 428/43 |
| 4,623,951 | A | * | 11/1986 | DuPont et al. | 361/218 |
| 4,630,168 | A | * | 12/1986 | Hunt | 361/218 |
| 5,845,872 | A | | 12/1998 | Pridham et al. | |
| 6,327,132 | B1 | | 12/2001 | Andrivet et al. | |
| 7,050,286 | B2 | | 5/2006 | Pridham et al. | |
| 7,307,825 | B2 | * | 12/2007 | De La Fuente De Ana et al. | 361/212 |
| 2005/0103936 | A1 | | 5/2005 | Pridham et al. | |
| 2007/0258182 | A1 | * | 11/2007 | Morrill et al. | 361/216 |

OTHER PUBLICATIONS

International Search Report issued May 19, 2009 in International (PCT) Application No. PCT/JP2009/055712.

* cited by examiner

*Primary Examiner* — Joseph W Sanderson
*Assistant Examiner* — Brian M O'Hara
(74) *Attorney, Agent, or Firm* — Wenderoth, Lind & Ponack, L.L.P.

(57) ABSTRACT

An aircraft assembly is equipped with a lightning protection structure that is not easily destroyed by lightning current and that is highly reliable. The aircraft assembly includes a skin in which a CFRP layer serves as a main structure, a shear-tie that supports the skin from the inside, and a fastener that couples the skin and the shear-tie. A copper foil and an outside GRFP layer are provided on an outer surface side of the skin, in this order towards the outside, and a copper paint layer, which contains copper powder, is provided on the outside GFRP layer.

8 Claims, 4 Drawing Sheets

AIRCRAFT ASSEMBLY

BACKGROUND OF THE INVENTION

I. Technical Field

The present invention relates to an aircraft assembly, such as a main wing and a fuselage of an aircraft, having a lightning protection structure.

II. Description of the Related Art

Accordingly, when using a composite material in a skin, it is required to consider the properties of lightning protection when making a structure, especially a structure that prevents lightning from passing through the fasteners.

As such lightning protection structures, for example, the disclosures of U.S. Pat. No. 4,630,168, specification, and U.S. Pat. No. 5,845,872, specification, have been proposed.

The structure disclosed in U.S. Pat. No. 4,630,168, specification, has an insulating cap attached to an outside end of the head of a fastener, and there have been many proposals for preventing the passage of lightning with such modifications to the structure of a fastener.

In the structure disclosed in U.S. Pat. No. 5,845,872, specification, a metal strap (conductive layer) is attached around a fastener and an insulation layer is provided above the head of the fastener, thereby dispersing the lightening current due to a lightning strike over the skin surface.

SUMMARY OF THE INVENTION

However, with the disclosure of U.S. Pat. No. 4,630,168, specification, the insulating caps are positioned at the surface of the skin, and there is a problem in that, when lightning current flows along the surface, the lightning current has to flow around these insulating caps, and the flow of the lightning current is thus obstructed.

In addition, the configuration in the disclosure of U.S. Pat. 5,845,872, specification is such that only one metal foil layer is provided as the conductive layer for dispersing lightning current; therefore, there is a risk of it being easily destroyed by the lightning current. Furthermore, there is a problem with a metal foil in that, although it depends on the thickness thereof, the conveying capacity for conveying the lightning current without being destroyed is small.

The present invention has been conceived in light of the above-described circumstances, and an object thereof is to provide an aircraft assembly provided with a lightning protection structure that is not easily destroyed by lightning current and that is highly reliable.

In order to solve the above-described problems, an aircraft assembly of the present invention employs the following solutions.

That is, a first aspect of an aircraft assembly according to the present invention is an aircraft assembly that includes a skin in which fiber reinforced resin serves as a main structure; a structural member that supports the skin from the inside; and a fastener that couples the skin and the structural member; wherein a conductive foil is provided on an outer surface side of the skin, and a conductive resin layer containing conductive powder is provided above the conductive foil.

When an aircraft assembly is hit by a lightning strike, an electric current generated by the lightning strike (hereinafter, referred to as "lightning current") flows in the conductive resin layer located at an upper layer. As compared with a conductive foil, this conductive resin layer, because it is formed of resin containing conductive powder, has a larger conveying capacity for the lightning current and has a higher capacity for dispersing the lightning current. Therefore, it is possible to minimize the damage caused by a lightning strike.

In addition, because a conductive foil is provided below the conductive resin layer, even in an unlikely event of the conductive resin layer being destroyed by a lightning strike, the lightning current can be dispersed by this conductive foil. Furthermore, the conductive foil is not mesh-like, but is a planar sheet uniformly extending with a predetermined sectional area; therefore, the capacity thereof for conveying the lightning current is superior as compared with the mesh-like ones.

Note that, as the "conductive resin layer", a phenol resin with copper particles mixed therein is preferable.

Furthermore, in the above-described first aspect, the fastener may be inserted into an insertion hole that penetrates through the main structure of the skin, the conductive foil, and the structural member; and a head portion of the fastener located on the outer surface side of the skin may have the conductive resin layer coated thereon.

The fasteners are disposed inserted in the insertion holes that penetrate through the main structure of the skin, the conductive foil, and the structural member. The top of the head portion of the fasteners is coated with the conductive resin layer. Accordingly, it is possible to prevent the lightning current from penetrating into the fasteners.

Note that in order to improve the lightning protection property of the fasteners, it is preferable that at least a portion of the exterior of the fastener heads be formed of insulating material. As this insulating material, a thermoplastic polyimide resin, PEEK, or the like, is preferable.

Furthermore, in the above-described first aspect, the fastener may have a tip portion that protrudes further inside from the structural member; the tip portion may be provided with a fixture that is inserted into the tip portion to secure the skin and the structural member; an insulating washer having a surface coated with an insulating material may be interposed between the structural member and the fixture; and an insulating spacer may be interposed between the structural member and the insulating washer.

In addition to an insulating washer whose surface is coated with an insulating material, an insulating spacer is provided; therefore, insulation can be ensured by the insulating spacer even if the insulating coating of the insulating washer peels off due to a shearing force exerted by deformation at the time of assembly. In this way, reliability is improved by doubly insulating with the insulating washer and the insulating spacer.

Additionally, when the lightning current passes through the fastener, there is a risk of spark occurrence in a minute gap between the fixture (for example, a nut) and the structural member. In the present invention, by interposing the insulating washer and the insulating spacer between the fixture and the structural member, a spark is prevented from occurring in the minute gap. Specifically, by adopting such a configuration that the insulating spacer is compressively deformed by the structural member and the insulating washer, it is possible to absorb an uneven minute gap created by errors during mounting of the fastener.

As the insulating spacer, polyimide is suitable, and it is further preferable that the configuration thereof be such that a plurality of sheets are laminated in the direction in which the compressive force is applied. This is because, with a configuration with a plurality of sheets, even if one layer of the sheets is damaged, the sheets in the other layers function effectively.

Furthermore, in the above-described first aspect, an insulating sealant may be provided between the fastener and the insertion hole.

By providing the insulating sealant between the fastener and the insertion hole, the insulating properties can be further enhanced between the fastener and the skin.

Note that with the insulating sealant provided between the fastener and the insertion hole, the fastener is not accurately positioned relative to the insertion hole when inserting the fastener thereinto. Specifically, the fastener is inserted into the insertion hole after the insulating sealant is applied to the fastener which is then fixed thereto by solidifying the insulating sealant; therefore, at the time of insertion, the fastener is not positioned in contact with the insertion hole. In other words, at time of insertion, the fastener is loosely fitted into the insertion hole (so-called clearance fit). Because the relative position between the insertion hole and the fastener is not accurately determined with such a clearance fit, an unintended uneven minute gap forms between the fastener and the fixture, becoming the cause of a spark. If the insulating spacer, which is compressed by the structural member and the insulating washer, is provided in such a case, even with a clearance fit, an uneven distribution of the minute gap can be prevented by compressive deformation of the insulating spacer, thereby preventing spark occurrence.

Furthermore, a second aspect of an aircraft assembly of the present invention is an aircraft assembly that includes a skin in which fiber reinforced resin serves as a main structure; a structural member that supports the skin from the inside; and a fastener that couples the skin and the structural member; wherein the fastener has a tip portion that protrudes further inside from the structural member; the tip portion is provided, via an insulating washer having a surface coated with an insulating material, with a fixture that is inserted into the tip portion to secure the skin and the structural member; and an insulating spacer is interposed between the structural member and the insulating washer.

In addition to an insulating washer whose surface is coated with an insulating material, an insulating spacer is provided; therefore, insulation can be ensured with the insulating spacer even if the coating of insulating material on the insulating washer peels off due to a shearing force exerted by deformation at the time of assembly. In this way, reliability is improved by doubly insulating with the insulating washer and the insulating spacer.

Additionally, when the lightning current passes through the fastener, there is a risk of spark occurrence in a minute gap between the fixture (for example, a nut) and the structural member. In the above-described second aspect, by interposing the insulating spacer and the insulating washer coated with the insulating material between the fixture and the structural member, a spark is prevented from occurring in the minute gap. Specifically, by adopting such a configuration that the insulating spacer is compressively deformed by the structural member and the insulating washer, it is possible to absorb an uneven minute gap created by errors during mounting of the fastener.

As the insulating spacer, polyimide is suitable, and it is further preferable that the configuration thereof be such that a plurality of sheets are laminated in the direction in which the compressive force is applied. This is because, with a configuration with a plurality of sheets, even if one layer of the sheets is damaged, the sheets in the other layers effectively function.

With the present invention, the following effects and advantages are afforded.

Because the conductive resin layer is provided along with the conductive foil provided therebelow, it is possible to obtain an aircraft assembly equipped with a lightning protection structure that is not easily destroyed by the lightning current and is highly reliable.

In addition, the insulating washer and the insulating spacer are interposed between the fixture and the structural member, thereby making it possible to improve reliability by double insulation.

DETAILED DESCRIPTION OF THE INVENTION

Figure 1:
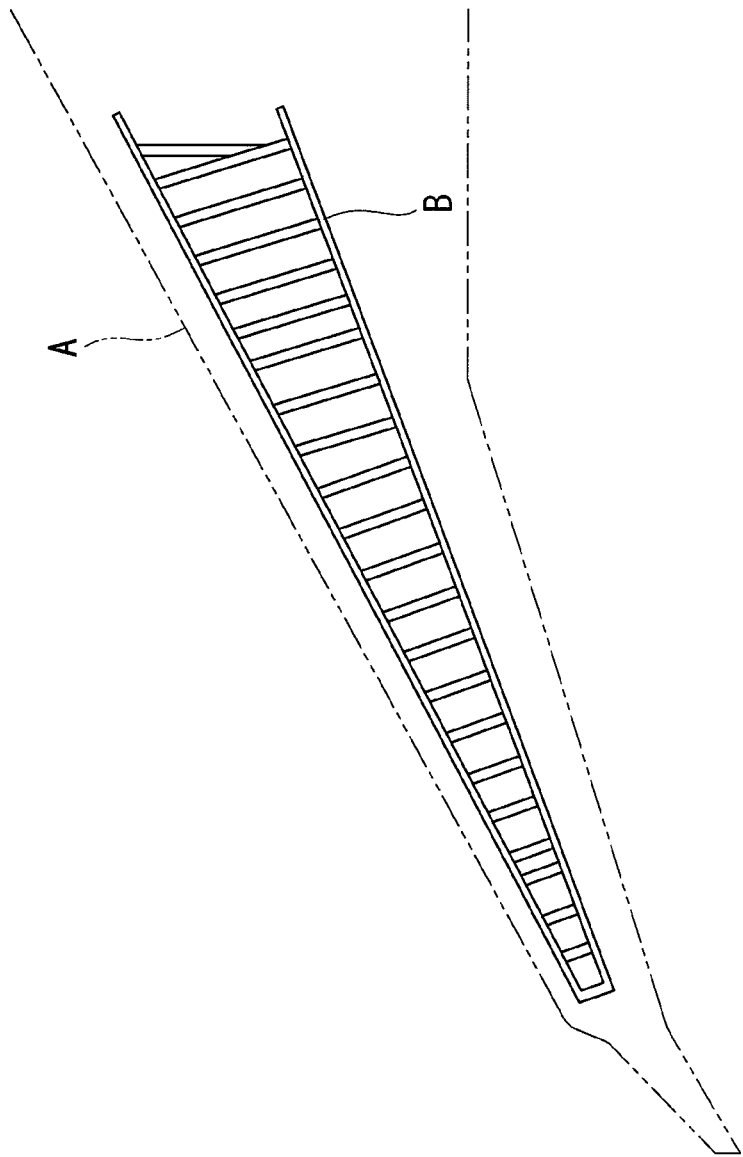
FIG. 1 is a plan view showing a main wing, which is an aircraft assembly of the present invention.

An embodiment according to the present invention will be described below, referring to the drawings.

FIG. 1 shows a plan view of a main wing (aircraft assembly) A of an aircraft. A rib line B includes a position at which a shear-tie (structural member) 11, described later, is disposed, and shows a region where copper paint (conductive resin layer) 19 or a copper foil (conductive foil) 13, described later, is disposed.

Figure 2:
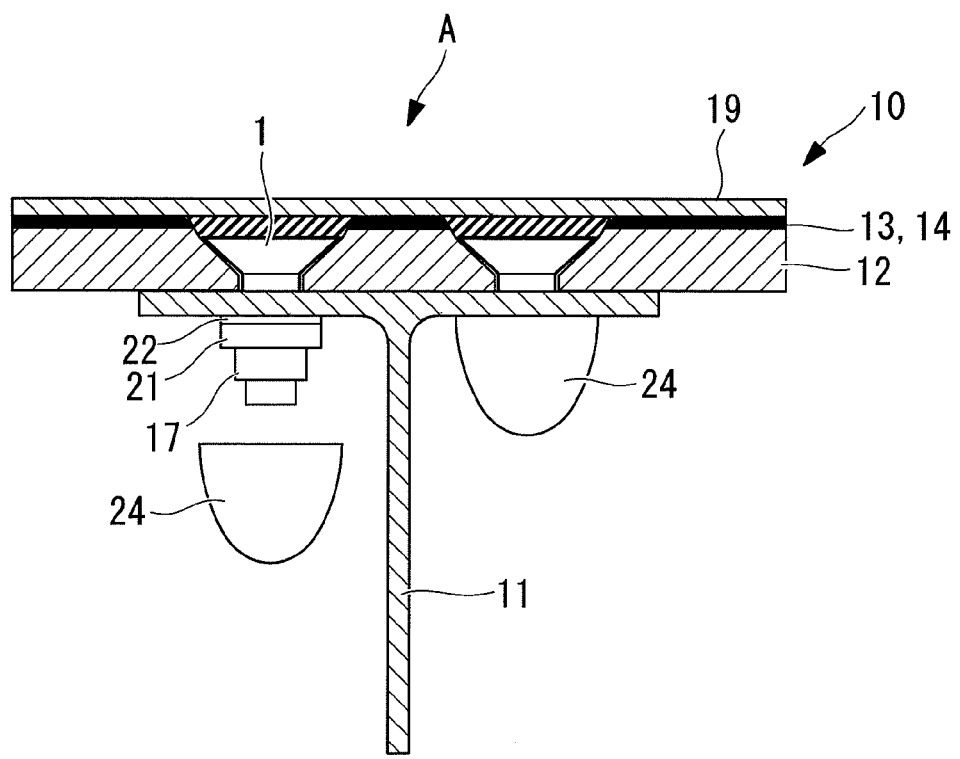
FIG. 2 is a sectional view, schematically showing the positional relationship between a shear-tie and a skin.

FIG. 2 schematically shows the positional relationship between a skin 10 and the shear-tie (Sea-Tie) 11. The shear-tie 11 is a member that joins the skin 10 and a stringer, a rib, and so on, and is assumed to be of a conductive material, such as aluminum alloy or titanium ally, or CFRP (carbon-fiber reinforced plastic). The skin 10 and the shear-tie 11 are fixed with a fastener 1. Specifically, a collar (nut) 17 is screwed on the tip of the fastener 1, thereby fastening the skin 10 and the shear-tie 11 to secure them together.

An insulating washer 21 and an insulating spacer 22 are interposed between the collars 17 and the shear-ties 11.

As shown on the right side of FIG. 2, the collar 17, the insulating washer 21, and the insulating spacer 22 are entirely covered by an insulating cap 24 that is formed of an insulating material such as resin, etc. The insulating cap 24 can also serve dual purpose as a fuel seal by being secured in close contact with the shear-ties 11.

Figure 3:
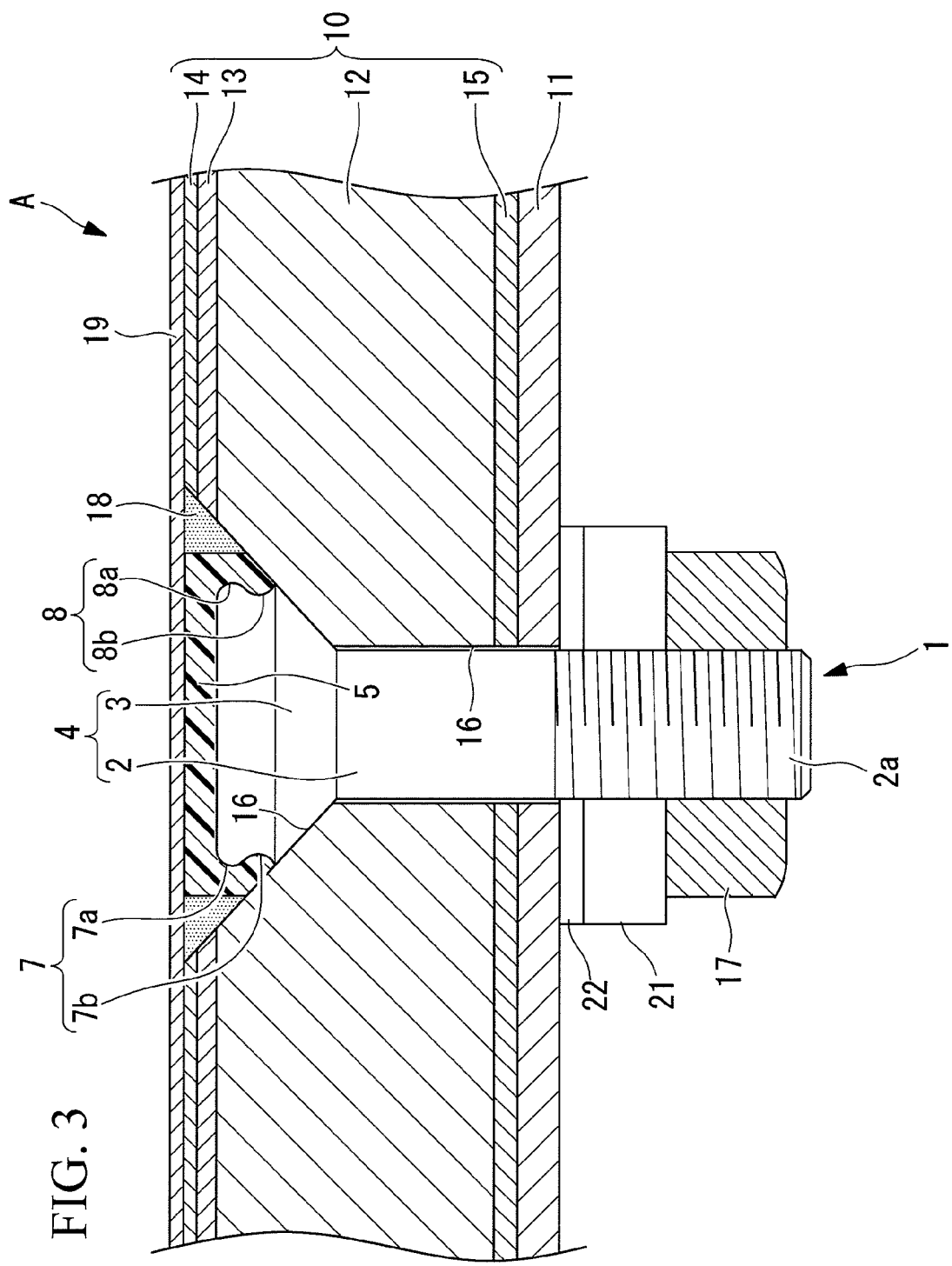
FIG. 3 is a sectional view showing FIG. 2 in more detail.

FIG. 3 shows the section shown in FIG. 2 in more detail. In addition, FIG. 4 is a cross-sectional view of the fastener 1.

Figure 4:
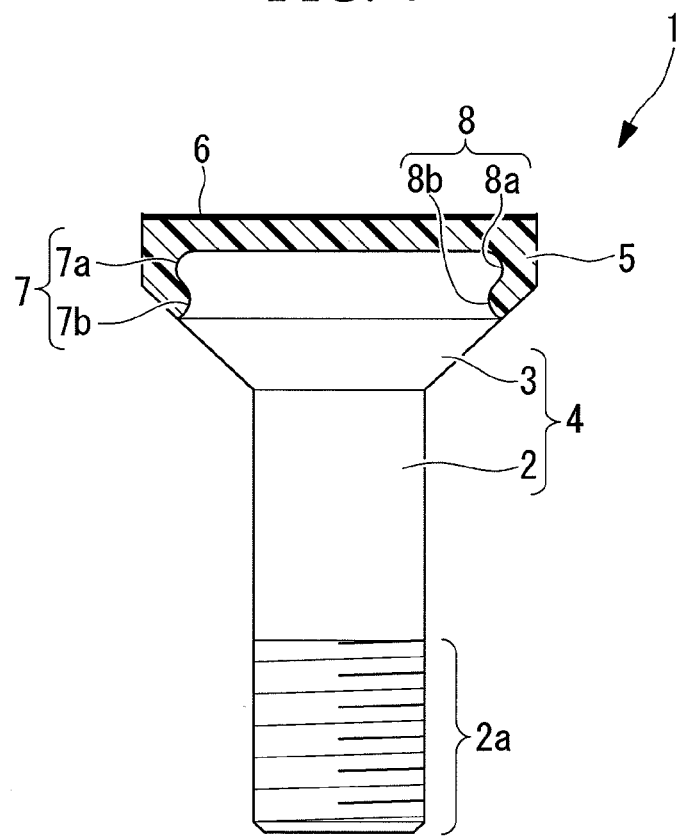
FIG. 4 is a lateral sectional view of a fastener according to the present embodiment, with a portion thereof shown in cross section.

As shown in FIGS. 3 and 4, the fastener 1 is constituted mainly of a fastener main body 4, which has a cylindrically shaped shaft portion (shank) 2; a head portion (flush head: flush head) 3 provided at one end of the shaft portion 2 and having a substantially frustoconical form whose diameter increases with increasing distance from the shaft portion 2; and an insulating head portion 5 positioned at one end (top portion located at the upper side of FIGS. 3 and 4) of the head portion 3.

The fastener main body 4 is integrally formed of the shaft portion 2 and the head portion 3 and is fabricated using an alloy of, for example, titanium (Ti-6Al-4V: annealed material), Inconel, or the like.

A male screw portion 2a that is threaded to a female screw portion of a collar (nut, fixture), described later, is formed on the other end (end portion at lower side in FIGS. 3 and 4) of the shaft portion 2.

A fastener-side engagement portion 7, to which the insulating head portion 5 is secured, is provided at the top portion of the head portion 3. The fastener-side engagement portion 7 is located on the opposite side from the shaft portion 2 (the upper side in FIGS. 3 and 4), and is provided with a convex portion 7a that protrudes radially outward around the circumferential direction (increases in diameter) and a concave portion 7b that connects (joins) the shaft portion 2 and the convex portion 7a and that is depressed radially inward around the circumferential direction.

Note that the diameter of the head portion 3 at one end surface is, for example, about 12.7 mm (½ inch).

The insulating head portion 5 is assumed to be a disk-like member. As a material for the insulating head portion 5, for example, a thermoplastic polyimide resin (for example, AURUM that can be obtained from Mitsui Chemicals, Inc.), which has superior heat-resistance and strength, is suitable. Examples of materials other than this include other thermoplastic resins (for example, polyether-imide (PEI) having heat resistance and strength in addition to a high dielectric breakdown voltage, polyether-ether-ketone (PEEK) having superior heat resistance and strength in addition to superior formability and versatility, polyphenylsulfide (PPS) having heat resistance and strength in addition to superior formability and versatility, and polyamide-imide (PAT) having particularly superior heat resistance and strength)) and thermosetting resins, etc.

An insulation-layer-side engagement portion 8, which is secured to the fastener-side engagement portion 7, is provided on a circumferential edge portion (end portion at the lower side in FIGS. 3 and 4) of the insulating head portion 5. The insulation-layer-side engagement portion 8 is provided with a concave portion 8a that is depressed radially inward around the circumferential direction and that couples with the convex portion 7a of the fastener-side engagement portion 7 and a convex portion 8b that protrudes (increases in diameter) radially outward around the circumferential direction and that couples with the concave portion 7b of the fastener-side engagement portion 7.

In addition, the insulating head portion 5 is formed by injection molding so as to be attached to the fastener-side engagement portion 7 of the head portion 3. Accordingly, outer surfaces of the fastener-side engagement portion 7 and inner surfaces of the insulation-layer-side engagement portion 8 are in close contact over the entirety thereof; therefore, the insulating head portion 5 is firmly secured to the head portion 3 by the adhesive force possessed by the insulating head portion 5 itself.

Note that it is desirable to make the plate thickness of the insulating head portion 5 (the length between the top surface (the flat surface located at the upper side in FIGS. 3 and 4) and the bottom surface (the flat surface located at the lower side in FIGS. 3 and 4), for example, about 0.5 mm to 1.0 mm, so as to provide sufficient dielectric strength even against the MIL-STD-1757A Zone 1 stroke test voltage (about 40 kV).

The skin 10 is mainly constructed of a CFRP (carbon-fiber reinforced plastic) layer 12, which is a resin material having conductivity (conductivity of about $1/100$ to $1/1000$ that of aluminum). The entire outer surface (the surface located on the outside after assembly) of the CFRP layer 12 is provided with an outside GFRP layer 14, which is GFRP (glass-fiber reinforced plastic) having insulating properties, and the entire inner surface (the surface located inside after assembly) of the CFRP layer 12 is coated with an inside GFRP layer 15.

In addition, a copper foil (conductive foil) 13, which has conductivity as a whole, is provided between the CFRP layer 12 and the outside GFRP layer 14. The thickness of the copper foil 13 is assumed to be about 70 μm.

The shear-ties 11 are made of, for example, aluminum alloy, titanium material, or CFRP (carbon-fiber reinforced plastic) and are disposed at a predetermined position on the back surface (the surface located inside after assembly) of the inside GFRP 15.

Insertion holes 16, which are capable of receiving the fasteners 1, are formed at predetermined positions of the structural member, at which the shear-ties 11 are disposed on the back surface of the inside GFRP 15, penetrating the skin 10 and the structural member 11 in the plate thickness direction. The fasteners 1 are accommodated in the individual insertion holes 16, and the collars 17, which are fabricated using, for example, an alloy of titanium, Inconel or the like, are screwed onto the male screw portions 2a that protrude inward from the back surface of the shear-ties 11.

An insulating sealant 18 is provided between the fastener 1 and the insertion hole 16. As the insulating sealant, polyphenylsulfide (PPS) can be suitably used. At the time of assembly, the fastener 1 is inserted into the insertion hole 16 after the shaft portion 2 and the head portion 3 of the fastener 1 are coated with the insulating sealant 18. Therefore, the external shape of the fastener 1 is smaller than that of the insertion hole 16 such that the fastener 1 is loosely fitted into the insertion hole 16 (so-called clearance fit).

A copper paint layer (conductive resin layer) 19 is provided on the outer surface side of the fastener 1, that is, on the insulating head portion 5. The copper paint layer 19 is provided so as to coat the fastener 1 and the periphery thereof.

The copper paint layer 19 is mainly constituted of a phenol resin and copper powder. As the copper powder, electrolytic copper powder with a grain size ranging from 2 to 10 μm, with a mean value of about 5 μm, is used. Because the electrolytic copper powder has a dendritic pointed shape, it is preferable for ensuring conductivity.

The blending ratio of the phenol resin and the copper powder is assumed to be 40 to 60%, preferably 50%, by volume of the copper powder.

The copper paint layer 19 is formed by solidification following its coating on the outside GFRP layer 14 of the skin 10 and the insulating head portion 5 of the fastener 1.

The thickness of the copper paint layer 19 is assumed to be about 150 μm.

Note that an epoxy-based or acryl-based resin can be used instead of the phenol resin used in the copper paint layer 19. In addition, instead of the copper powder, conductive grains such as Ni, Au, Ag, Ag-coated Cu (Cu grains coated with Ag), graphite, etc. can be used.

Although not shown in FIG. 3, the copper paint layer 19 is coated with an epoxy-based primer coat of about 20 μm in thickness, on top of which a urethane-enamel based top coat of about 50 μm in thickness is further coated.

The insulating washer 21 and the insulating spacer 22 are interposed between the shear-tie 11 and the collar 17.

The insulating washer 21 is configured having a main body made of metal material such as stainless steel, etc., the outer surface of which is coated with insulating material such as resin (for example, resin containing aluminum powder).

The insulating spacer 22 has a structure in which a plurality of polyimide films are laminated. The insulating spacer 22 is configured so as to be deformed by a compressive force applied thereto through tightening of the collar 17. Even when deformed in this way, because the insulating spacer 22 has a structure in which a plurality of insulation films are laminated, even if one of the insulation films is broken, the breakage is not propagated to the other insulation films; therefore, the structure as a whole is resistant to breakage. Note that the insulating spacer 22 may be further laminated with fibers, thereby employing a structure with an even greater resistance to breakage.

The insulating spacer 22 is assumed to have a diameter substantially equivalent to the insulating washer 21. This is to prevent a crack from forming due to the pressure of the insulating washer.

In addition, an outer peripheral edge and an inner peripheral edge of an end surface of the collar 17 on the insulating washer 21 side may be chamfered. By doing so, damage to the insulating washer 21 can be prevented.

A lightning protection test was conducted for an aircraft assembly configured according to the above-described embodiment.

Configurations of the present invention and Comparative Examples 1 and 2 are shown in a table below. Configurations other than those shown in the table below are all equivalent regarding the present invention and the Comparative Examples 1 and 2.

TABLE 1

| Sample | Rib top | Rib line | Spark present/absent |
|---|---|---|---|
| Comparative Example 1 | Aluminum tape | Copper foil | Present |
| Comparative Example 2 | Copper paint | Copper mesh | Present |
| Present invention | Copper paint | Copper foil | Absent |

In Table 1, "rib top" indicates the position of the copper paint layer 19 in FIG. 3 and indicates a member located immediately above the fastener 1.

Figure 5:
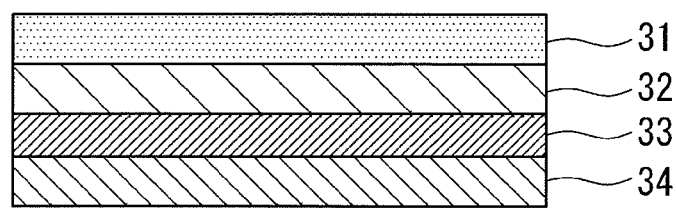
FIG. 5 is a sectional view of aluminum tape used as Comparative Example 1 in the embodiments.

As shown in FIG. 5, the aluminum tape is formed by laminating with a polyurethane layer 31 with 30 μm thickness, an adhesive layer 32 with 30 μm thickness, an Al layer 33 with 20 μm thickness, and an adhesive layer 34 with 30 μm thickness, in this order from the outer surface side towards the inside.

The thickness of the copper paint layers used in Comparative Example 2 and the present invention are assumed to be 150 μm in thickness. This is selected so as to have an electrical resistance equivalent to that of the aluminum tape.

In Table 1, "rib line" indicates the position of the copper foil 13 in FIG. 3 and indicates a peripheral region of the fastener 1. The thickness of the copper foil is assumed to be 70 μm. Unlike the foil, which is assumed to be solid, a copper mesh used in Comparative Example 2 is assumed to be mesh-like in plan view.

The lightning protection test was conducted according to SAE APR5412A. The presence/absence of a spark was evaluated by detecting a spark of 0.02 mJ using a digital camera equivalent to ASA3000. Images were captured from the inner surface side (shear-tie 11 side in FIG. 3).

The lightning protection tests were individually conducted on nine test panels based on the conditions shown in the table below; those in which a spark was detected even once were evaluated as spark present, and those in which no spark was detected were evaluated as spark absent.

TABLE 2

| Applied Zone | Comp D | Comp B | Comp C* | Note |
|---|---|---|---|---|
| 2A+ | Peak I = 150 KA Al = 1.125 × $10^6$ A2S | Max Charge Transfer = 10C | Amp > 400 A Dwell Time = 45 ms | 50% margin |

TABLE 2-continued

| Applied Zone | Comp D | Comp B | Comp C* | Note |
|---|---|---|---|---|
| 2A | Peak I = 100 KA Al = 0.25 × $10^6$ A2S | Max Charge Transfer = 10C | Amp > 400 A Dwell Time = 45 ms | |
| 3+ | Peak I = 60 KA Al = 0.18 × $10^6$ A2S | Max Charge Transfer = 10C | Amp > 400 A Dwell Time = 45 ms | 50% margin |

In Table 2, "Applied Zone" indicates a zone of lightning protection countermeasures for an aircraft. "+" indicates evaluations at a 50% greater lightning current level.

"Comp D", "Comp B", and "Comp C*" indicate components of lightning current, respectively.

As shown in Table 1, only for the present invention, no spark occurrence was observed at all. From a comparison with Comparative Example 1, this result is due to the copper paint layer 19, and from a comparison with Comparative Example 2, the result is due to the copper foil 13. Because a detailed mechanism for this result has not been elucidated, it is merely speculation; however, it is likely that the copper paint layer 19 has superior conveying capacity and dispersing capacity of the lightning current than the aluminum tape, and, in addition, the copper foil 13 has superior conveying capacity and dispersing capacity of the lightning current than the copper mesh.

As has been described above, this embodiment affords the following effects and advantages.

When a lightning strikes the main wing A, the lightning current flows in the copper paint layer 19 located at the upper layer. Because this copper paint layer 19 is resin containing copper powder, as compared with conductive foils such as aluminum tape and the like, its conveying capacity for the lightning current is larger and it has greater ability to disperse the lightning current. Therefore, it is possible to minimize damage caused by a lightning strike.

In addition, because the copper foil 13 is provided below the copper paint layer 19, even in the unlikely event of the copper paint layer 19 being destroyed by a lightning strike, the lightning current can be dispersed by the copper foil 13. Furthermore, the copper foil 13 is not mesh-like, but is a planar sheet that uniformly extends with a predetermined sectional area; therefore, the capacity thereof for conveying the lightning current is superior as compared with the mesh-like ones.

The insulating head portion 5 of the fastener 1 is coated with the copper paint layer 19. Accordingly, it is possible to prevent the lightning current from penetrating into the fastener 1.

In addition, when the lightning current passes through the fastener 1, there is a risk of spark occurrence in the minute gap between the collar 17 and the shear-tie 11. With this embodiment, a spark is prevented from occurring in the minute gap by interposing the insulating washer 21, which is coated with an insulating material, and the insulating spacer 22 between the collar 17 and the shear-tie 11. Accordingly, by doubly insulating with the insulating washer 21 and the insulating spacer 22, reliability can be improved. Specifically, by adopting such a configuration that the insulating spacer 22 is compressively deformed by the shear-tie 11 and the insulating washer 21, it is possible to absorb an uneven minute gap created by errors during mounting of the fastener 1.

Because the fastener 1 is clearance fitted into the insertion hole 16, the relative position between the insertion hole 16 and the fastener 1 is not accurately determined; therefore, an unintended uneven minute gap forms among the shear-tie 11, the fastener 1 and the collar 17, and thus there is a risk of the gap becoming the cause of a spark. In this embodiment, because the insulating spacer 22, which is compressed by the shear-tie 11 and the insulating washer 21, is provided, even with a clearance fit, an uneven distribution of the minute gap can be prevented by compressive deformation of the insulating spacer 22; thereby, making it possible to prevent spark occurrence.

In addition, because the insulating spacer 22 is configured with a plurality of sheets that are laminated in the direction in which the compressive force is applied, even if one layer of the sheets is damaged, it is possible to make the sheets in the other layers function effectively.

Note that in the above-described embodiment, the main wing A was described as an example of an aircraft assembly; however, the aircraft assembly is not limited to this, and, for example, a fuselage, tail wing, and the like are also applicable.

In addition, the insulating spacer 22 has been described in terms of a configuration wherein a plurality of sheets are laminated; however, the present invention is not limited thereto, and it may be a single-layer thermoplastic polyimide resin (for example, AURUM available from Mitsui Chemicals, Inc.).

The invention claimed is:

1. An aircraft assembly comprising:
    a skin having an inside, an outer surface side and fiber reinforced resin as a main structure;
    a structural member supporting the skin from the inside;
    a fastener coupling the skin and the structural member;
    a conductive foil disposed on the outer surface side of the skin;
    a conductive resin layer containing conductive powder disposed above the conductive foil;
    an insulating washer having a surface coated with an insulating material;
    an insulating spacer interposed between the structural member and the insulating washer; and
    a first glass-fiber reinforced plastic between the conductive foil and the conductive resin layer and a second glass-fiber reinforced plastic between the fiber reinforced resin and the structural member,
    wherein the fastener has a tip portion protruding inside from the structural member, the tip portion is disposed, via the insulating washer, in a fixture so as to secure the skin and the structural member.

2. The aircraft assembly according to claim 1, wherein the fastener is disposed in an insertion hole penetrating through the main structure of the skin, the conductive foil, and the structural member; and
    a head portion of the fastener is disposed on the outer surface side of the skin and has the conductive resin layer coated thereon.

3. The aircraft assembly according to claim 2, wherein the insulating washer is interposed between the structural member and the fixture.

4. The aircraft assembly according to claim 3, wherein an insulating sealant is disposed between the fastener and the insertion hole.

5. The aircraft assembly according to claim 1, wherein the fastener has an insulating head portion that is adjacent the conductive resin layer.

6. The aircraft assembly according to claim 5, wherein the insulating head portion has a convex portion and a concave portion that interlock with a concave portion and a convex portion of a head portion of the fastener, respectively.

7. The aircraft assembly according to claim 1, wherein the insulating washer has a main body made of metal, and the insulating material is resin.

8. The aircraft assembly according to claim 7, wherein the insulating spacer has plurality of laminated polyimide films.

\* \* \* \* \*